(12) United States Patent
Kozat et al.

(10) Patent No.: US 10,178,036 B2
(45) Date of Patent: Jan. 8, 2019

(54) METHOD AND APPARATUS FOR VIRTUALIZED RESOURCE BLOCK MAPPING

(71) Applicant: ARGELA-USA, INC., Sunnyvale, CA (US)

(72) Inventors: Ulas Can Kozat, Mountain View, CA (US); Mehmet Oguz Sunay, San Francisco, CA (US)

(73) Assignee: NETSIA, INC., Sunnyvale, CA (US)

( * ) Notice: Subject to any disclaimer, the term of this patent is extended or adjusted under 35 U.S.C. 154(b) by 138 days.

(21) Appl. No.: 15/218,783

(22) Filed: Jul. 25, 2016

(65) Prior Publication Data

US 2017/0026296 A1    Jan. 26, 2017

Related U.S. Application Data

(60) Provisional application No. 62/196,996, filed on Jul. 25, 2015.

(51) Int. Cl.
*H04L 12/851* (2013.01)
*H04L 12/927* (2013.01)
*H04W 72/12* (2009.01)

(52) U.S. Cl.
CPC ........ *H04L 47/2425* (2013.01); *H04L 47/805* (2013.01); *H04W 72/1263* (2013.01); *H04W 72/121* (2013.01); *H04W 72/1226* (2013.01)

(58) Field of Classification Search
CPC ................ H04L 47/2425; H04W 72/1226
See application file for complete search history.

(56) References Cited

U.S. PATENT DOCUMENTS

| 8,351,948 B2 | 1/2013 | Kokku et al. |
| 8,700,047 B2 | 4/2014 | Kokku et al. |
| 8,873,482 B2 | 10/2014 | Kokku et al. |
| 8,874,125 B2 | 10/2014 | Mahindra et al. |
| 9,338,099 B2 * | 5/2016 | Sundar ............ H04L 45/00 |

(Continued)

OTHER PUBLICATIONS

A software WiMAX medium access control layer using massively multithreaded processors; by M. Chetlur, U. Devi, P. Dutta P. Gupta, L. Chen, Z. Zhu, S. Kalyanaraman, Y. Lin; IBM J. Res. & Dev. vol. 54 No. 1 Paper 9 Jan./Feb. 2010.*

*Primary Examiner* — Hassan Kizou
*Assistant Examiner* — Deepa Belur
(74) *Attorney, Agent, or Firm* — IP Authority, LLC; Ramraj Soundararajan

(57) ABSTRACT

Disclosed within is a communication architecture for medium access control (MAC) layer virtualization, where the architecture is made up of: a physical MAC layer, a plurality of physical resource blocks (RBs) associated with the MAC layer, a plurality of virtual medium access control (vMAC) layers, where each vMAC layer corresponds to a separate service group, with each service group programming its own scheduling logic in each vMAC layer, and a plurality of virtual resource blocks (vRBs) associated with each vMAC layer, where the vRBs are filled with data packets according to the scheduling logic in each vMAC instance. The physical MAC layer virtualizes the RBs as vRBs and assigns them to each vMAC layer according to a service level agreement associated with each service group, and each vMAC maps traffic flows of subscribers associated with it onto the assigned vRBs.

24 Claims, 6 Drawing Sheets

(56) References Cited

U.S. PATENT DOCUMENTS

| | | | |
|---|---|---|---|
| 2009/0304002 A1* | 12/2009 | Yu | H04L 49/30 370/395.3 |
| 2009/0304022 A1* | 12/2009 | Yang | H04L 49/90 370/463 |
| 2011/0029347 A1 | 2/2011 | Kozat et al. | |
| 2012/0002620 A1 | 1/2012 | Kokku et al. | |
| 2012/0044876 A1 | 2/2012 | Taaghol | |
| 2012/0243483 A1* | 9/2012 | Ahmadi | H04L 5/0044 370/329 |
| 2013/0094486 A1 | 4/2013 | Bhanage et al. | |
| 2014/0161108 A1* | 6/2014 | Lohr | H04L 5/0007 370/336 |
| 2014/0247796 A1* | 9/2014 | Ouchi | H04L 5/0053 370/329 |
| 2015/0092704 A1* | 4/2015 | Chen | H04W 72/1231 370/329 |
| 2016/0088068 A1* | 3/2016 | Toy | H04L 67/1097 709/219 |
| 2017/0180466 A1* | 6/2017 | Li | H04L 67/104 |
| 2017/0331670 A1* | 11/2017 | Parkvall | H04J 11/0079 |
| 2018/0175924 A1* | 6/2018 | Ercan | H04W 76/16 |

\* cited by examiner

METHOD AND APPARATUS FOR VIRTUALIZED RESOURCE BLOCK MAPPING

BACKGROUND OF THE INVENTION

Field of Invention

The present application relates to the medium access control operations of the radio access networks of wireless broadband communication systems, and more particularly, methods and apparatus for virtualizing the available wireless system resources and decoupling the user scheduling operation from the operation of resource assignment in base stations.

Discussion of Related Art

This invention is concerned with the specification of a method and apparatus for the virtualization of wireless resources for a wireless system where multiple virtual MAC layer slices may operate simultaneously in a base station. While the scheduling operations conducted by the virtual MAC layers decide on which users and flows will get service, the assignment of the physical wireless resources to these users and flows is decoupled from such scheduling operations.

The patent application US 20110029347 A1 presents a wireless network virtualization scheme, where each MVNO bids for resource blocks by providing a per-user rate-utility function to the network operator. The Mobile Network Operator (MNO) who owns the network in return makes rate allocations to each MVNO, set current and future prices for the resource blocks, based on sum-utility maximization across all users. MVNOs transfer the bytes for each user based on the allocation and update utility functions of each user.

The patent application US 20130094486 A1 discloses a virtualization scheme for wireless local area networks, where multiple virtual access points sharing the same physical access point are granted time shares to access the resources of the physical access point for transmitting the data packets of users associated with the said virtual access points over the wireless medium.

The patent application US 20120044876 A1 discloses a virtualized base station belonging to an operator A and a mobile subscriber of another operator B can access to its home network (i.e., B) after a virtual base station that is part of operator B is instantiated on the virtualized base station that belongs to operator A.

The patent specification U.S. Pat. No. 8,873,482 B2 discloses a wireless network virtualization substrate at the scheduling layer, where bandwidth and/or slot reservations are requested from the virtualization substrate. The virtualization substrate first picks a slice to schedule over a slot (e.g., after sorting each slice with respect to the ratio of bandwidth/resource allocated and bandwidth/resource reserved). The invention also includes utility maximization based allocation strategies in deciding which slice should be assigned to which slot. Then, the virtualization substrate schedules the flows of the selected slice on the allocated slots. Each slice can control the ordering of flows and packets by specifying the scheduling policy for its own flows, putting virtual time tags in the packet headers, or any other means that do not impede the line speed processing.

The patent specifications U.S. Pat. No. 8,351,948 B2 and U.S. Pat. No. 8,700,047 B2 both disclose a customizable flow management in a cellular base station, where a plurality of custom flow management schedulers coexists on the same base station. Each flow management scheduler executes a flow management function, which can be configured and programmed by an external entity to change the flow selection process in each scheduler.

The patent application US 20120002620 A1 discloses a method for remotely virtualizing the flows from an entity external to the base station without modifying the base station itself. The virtualization entity shapes the traffic flows and schedules them before forwarding them to the base station entity. A synchronizing function on the external entity prevents packets being backlogged at the base station by matching the shaped traffic rate to the base station's transmission rate.

The patent specification U.S. Pat. No. 8,874,125 B2 discloses a method where a plurality of individually virtualized base stations in a radio access network is shared by multiple entities. At an aggregator/gateway node, resources are allocated centrally to each entity on all base stations connected to the said aggregator node. Aggregator/gateway node dynamically computes the optimal resource share of each entity on each base station based on revenue maximization. The computed shares are passed onto the scheduler at each base station, where the resource shares of entities are locally enforced.

Embodiments of the present invention are an improvement over prior art systems and methods.

SUMMARY OF THE INVENTION

In one embodiment, the present invention provides a mapping method as to implemented in a communication architecture for medium access control (MAC) layer virtualization, said communication architecture comprising a physical MAC layer, a plurality of physical resource blocks (RBs) associated with the MAC layer, a plurality of virtual medium access control (vMAC) layers, each vMAC layer corresponding to a separate service group, where each service group programs its own scheduling logic in each vMAC layer, a plurality of virtual resource blocks (vRBs) associated with each vMAC layer, the vRBs filled with data packets according to the scheduling logic in each vMAC instance, the physical MAC layer virtualizing the RBs as vRBs and assigning them to each vMAC layer according to a service level agreement associated with each service group, each vMAC mapping traffic flows of subscribers associated with it onto assigned vRBs, service group-i leasing $N_{SG-i}$ vRBs, the method comprising: (a) for each service group-i, computing a per RB group Channel State Information (CSI) value, $CSI_{SG-i,RB}$, using CSI values of each user of that service group for that RB; (b) for each service group-i, ordering RBs according to their $CSI_{SG-i,RB}$ values in descending order; (c) tentatively assigning $N_{SG-i}$ RBs having highest group CSI values to vRBs that each service group has leased; (d) when a conflict exists when there is a RB that has been assigned to multiple service groups, determining a service group's next best unassigned RB* in list of ordered RBs, where service group having least number of remaining next best unassigned RB*'s is assigned a particular conflicting RB and all other service groups are assigned their next best unassigned RB*'s; and (e) repeating step (d) until no conflicts exist.

In another embodiment, the present invention provides an article of manufacture comprising non-transitory computer storage medium storing computer readable program code which, when executed by a computer, implements a mapping method as implemented in a communication architecture for medium access control (MAC) layer virtualization, said communication architecture comprising a physical MAC layer, a plurality of physical resource blocks (RBs) associated with the MAC layer, a plurality of virtual medium access control (vMAC) layers, each vMAC layer corresponding to a separate service group, where each service group programs its own scheduling logic in each vMAC layer, a plurality of virtual resource blocks (vRBs) associated with each vMAC layer, the vRBs filled with data packets according to the scheduling logic in each vMAC instance, the physical MAC layer virtualizing the RBs as vRBs and assigning them to each vMAC layer according to a service level agreement associated with each service group, each vMAC mapping traffic flows of subscribers associated with it onto assigned vRBs, service group-i leasing $N_{SG-i}$ vRBs, the method comprising: (a) for each service group-i, computer readable program code computing a per RB group Channel State Information (CSI) value, $CSI_{SG-i,RB}$, using CSI values of each user of that service group for that RB; (b) for each service group-i, computer readable program code ordering RBs according to their $CSI_{SG-i,RB}$ values in descending order; (c) computer readable program code tentatively assigning $N_{SG-i}$ RBs having highest group CSI values to vRBs that each service group has leased; (d) when a conflict exists when there is a RB that has been assigned to multiple service groups, computer readable program code determining a service group's next best unassigned RB* in list of ordered RBs, where service group having least number of remaining next best unassigned RB*'s is assigned a particular conflicting RB and all other service groups are assigned their next best unassigned RB*'s; and (e) computer readable program code repeating step (d) until no conflicts exist.

In yet another embodiment, the present invention provides a communication architecture implementing a mapping scheme for medium access control (MAC) layer virtualization, said communication architecture comprising: a physical MAC layer, a plurality of physical resource blocks (RBs) associated with the MAC layer, a plurality of virtual medium access control (vMAC) layers, each vMAC layer corresponding to a separate service group, where each service group programs its own scheduling logic in each vMAC layer, a plurality of virtual resource blocks (vRBs) associated with each vMAC layer, the vRBs filled with data packets according to the scheduling logic in each vMAC instance, the physical MAC layer virtualizing the RBs as vRBs and assigning them to each vMAC layer according to a service level agreement associated with each service group, each vMAC mapping traffic flows of subscribers associated with it onto assigned vRBs, where service group-i leasing $N_{SG-i}$ vRBs, and where the mapping scheme: (a) computes, for each service group-i, a per RB group Channel State Information (CSI) value, $CSI_{SG-i,RB}$, using CSI values of each user of that service group for that RB; (b) orders, for each service group-i, RBs according to their $CSI_{SG-i,RB}$ values in descending order; (c) tentatively assigns $N_{SG-i}$ RBs having highest group CSI values to vRBs that each service group has leased; (d) when a conflict exists when there is a RB that has been assigned to multiple service groups, determines a service group's next best unassigned RB* in list of ordered RBs, where service group having least number of remaining next best unassigned RB*'s is assigned a particular conflicting RB and all other service groups are assigned their next best unassigned RB*'s; and (e) repeats step (d) until no conflicts exist.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
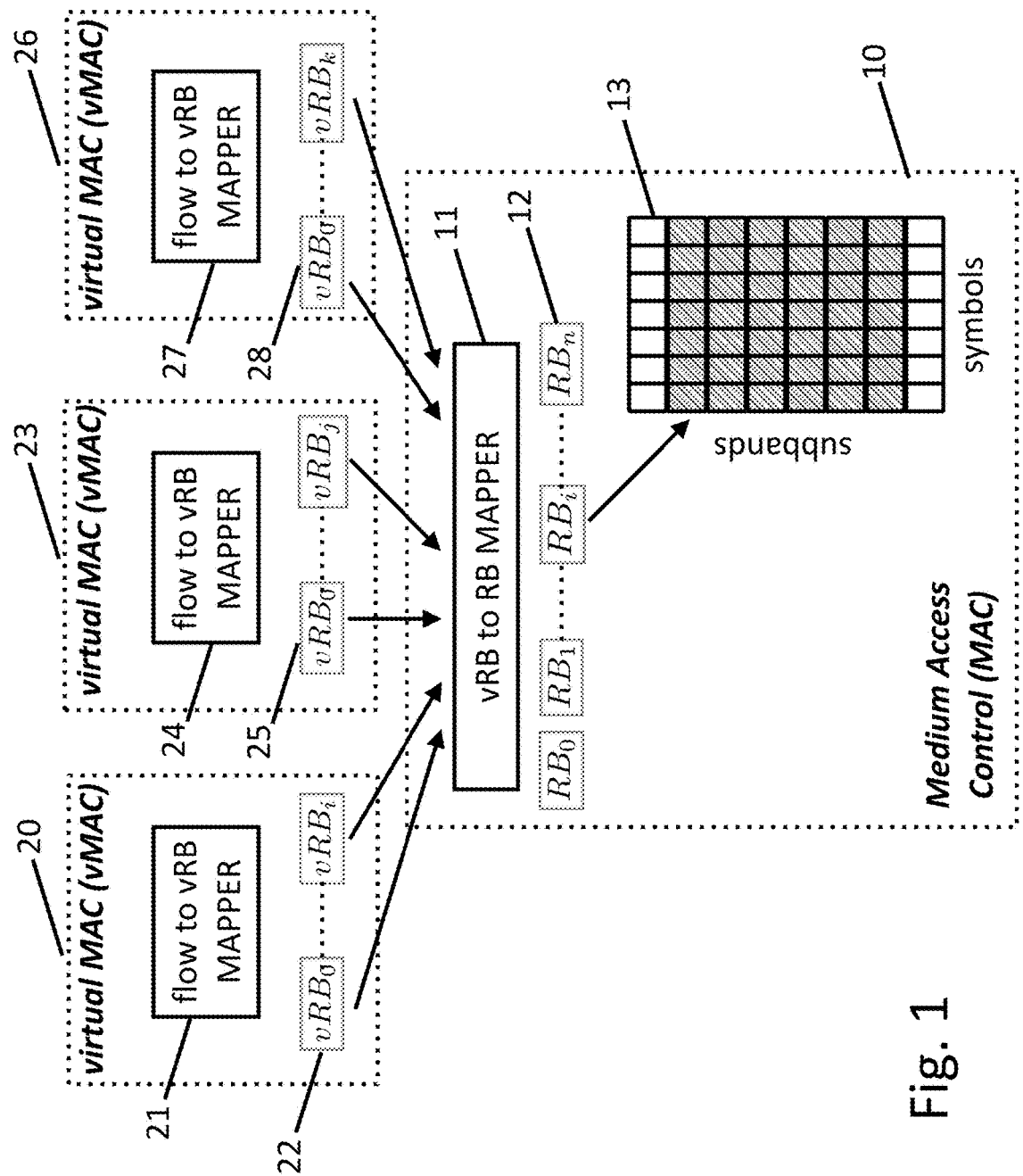
FIG. 1 depicts the overall virtualization architecture of the invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention considers a wireless network where users or flows of users sharing a common spectrum are grouped together so that each group may be subjected to its own set of medium access (MAC) protocols. The network operator or service provider that serves a plurality of subscribers defines a service group for said plurality of subscribers and controls the corresponding virtualized MAC for the said service group. The grouping of users or flows of users into service groups may be in one or more of the following ways:

In an environment where one mobile network operator (MNO) and one of more mobile virtual network operators (MVNOs) utilize the same spectrum, users may be grouped according to their network operator subscriptions, Users may be grouped according to their service subscription profiles, Users may be grouped according to their geography and time specific radio resource reservation requests, Flows of users may be grouped according to flow profiles where a flow profile includes but is not limited to the following: flow type, flow header contents, over-the-top service provider identity.

The virtual medium access control layers (vMACs) for all existing service groups are deployed on top of the physical mobile operator's medium access control layer. One or more vMACs may be programmatically invoked, modified or terminated at a given time. Virtualizing the MAC layer into multiple distinct slices as vMACs provides the same semantics to each network operator or service provider controlling one or more service groups as if they were the MNO to conduct scheduling. The scheduling operation dynamically maps user flows to each service group is provided a set of virtual Resource Blocks (vRB) and virtual Channel State Information (vCSI) per service group subscriber. The mapping operation of the vRBs to the actual resource blocks (RBs) allocated by the MNO based on the actual CSI information of all subscribers being served is decoupled from the scheduling operation that is conducted by the network operator controlling the service group. Each network operator or service provider controlling a service group implements its own virtual Medium Access Control (vMAC) for that group independent of the other vMACs present in the network for other service groups. A network operator or service provider may invoke multiple vMACs, a distinct one for each service group it controls. The implementations of the vMACs are based on the vRBs and vCSI provided by the MNO.

For this wireless network, the invention discloses methods and apparatus for a base station to calculate vCSIs per subscriber as well as methods and apparatus to map the vRBs to RBs in the presence of multiple vMACs, a distinct one for each service group. The MNO is responsible for assigning virtual resource blocks (vRBs) to each service group. The service groups lease a number of vRBs for a given time period and may pay a monetary fee per vRB as specified by the MNO. Each vMAC dynamically schedules its own traffic flows on one or more of the vRBs that its service group leases.

Each vMAC utilizes virtual channel state information (vCSI) provided by the MNO for each active subscriber device of the corresponding service group to perform channel aware scheduling.

The method disclosed herein is composed of two stages:
1. The MNO first decides how to map vRBs each service group leased to physical RBs. This mapping is conducted so that there are no conflicts in the overall mapping,
2. Based on this mapping, as well as the CSIs received from all users, the hybrid ARQ statuses and QoS class information of the flows, and the amount of backlogs in the flow queues, the MNO calculates vCSIs for all users and shares these values with the relevant vMACs so they can conduct their independent scheduling operations. The vCSI value specified for each user by the MNO guarantees that the vRBs assigned to each user have service guarantees, i.e., MNO can map these vRBs to physical RBs that have equal or higher actual CSI values. MNO can serve a higher rate on a given RB than the rate supportable by the advertised vCSI for the subscriber.

This invention enables a simple virtualization framework for the wireless resources, where service groups can make channel aware resource block assignments to take advantage of multi-user diversity while most of the underlying physical layer states are hidden from them. The invention also gives flexibility to the MNO to dynamically assign physical resource blocks to each service group.

FIG. 1 depicts the overall virtualization architecture of the invention. MNO oversees the Medium Access Control layer of the base station (10 in FIG. 1) and has full control over how resource blocks (12) are mapped to the wireless channels (13). This mapping is typically described in wireless standards. In FIG. 1, the wireless channels are two-dimensional resources with orthogonal time slots and frequency sub-bands as in the case of LTE systems. It suffices to say that the invention covers any other channelization strategies (orthogonal or non-orthogonal channels) without any loss of generality. The MAC (10) has a fixed number of resource blocks. Unlike the traditional systems, where the MAC layer assigns resource blocks directly to a number of wireless user equipment (UEs), the MAC layer in this invention assigns resource blocks to virtual Resource Blocks (vRBs). Block 11 in FIG. 1 depicts this stage, i.e., vRB to RB Mapper. The mapping logic and strategy depends on the type of services, guarantees, and other optimization objectives the MNO determines. The MAC layer virtualizes its resource blocks and assigns vRBs to virtual MAC layers based on the service level agreements for the corresponding service groups. In FIG. 1, as an example, three vMAC slices (20, 23, 26) are shown each belonging to a separate service group. Furthermore, in the example, vMAC slice (20) is allocated i vRBs, vMAC slice (23) is allocated j vRBs and vMAC slice (26) is allocated k vRBs. The vMAC slices are unaware of each other and from their point of view, they are the sole user of their allocated resource blocks. The enumeration of the vRBs (22, 25, 28 in FIG. 1) assigned to each vMAC may be overlapping (or the same). It is the MAC layer's responsibility to uniquely identify each vMAC slice and distinguish between the vRBs of distinct vMACs that use the same ID space. Each vMAC is responsible for mapping the traffic flows of their subscribers onto the vRBs assigned to them by the MAC layer. The scheduling decisions taken in (21), (24), (27), and the vRB to RB mapping decision taken in (11) jointly determine which flow packets are assigned to which RB and hence wireless channels.

Figure 2:
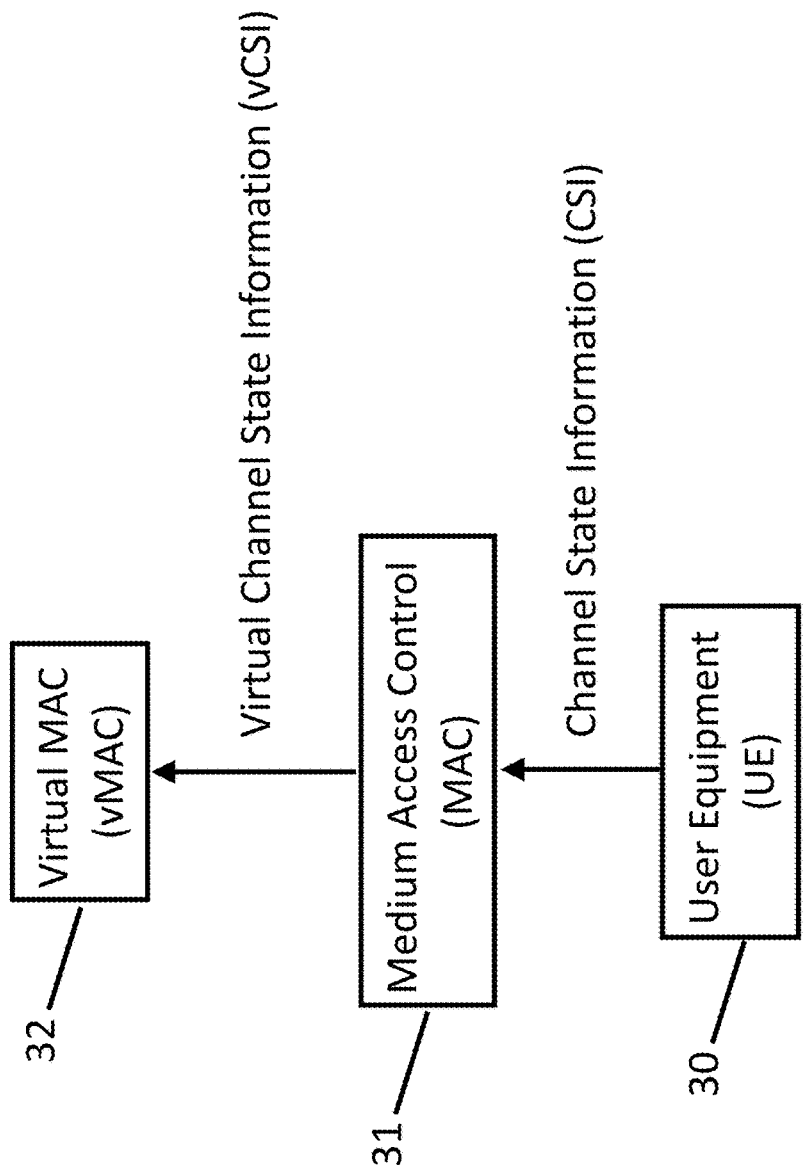
FIG. 2 illustrates how Channel State Information (CSI) is feedback from one UE to the MAC layer and then to an instance of a vMAC.

FIG. 2 depicts how Channel State Information (CSI) is feedback from one UE (30) to the MAC layer (31), and then to an instance of a vMAC (32). The CSI feedback by the UE may be for a few channels (e.g., subband and time slots as in LTE) and the MAC layer may interpolate these values to estimate the CSI for each resource block. The MAC layer transforms per UE per RB CSI into per UE per vRB virtual CSI (vCSI) per for each vMAC instance. The vCSI along with the queue states of UEs and QoS classes of traffic flows as well as the hybrid ARQ statuses determine how each vMAC make assignment decisions for their own traffic flows.

Figure 3:
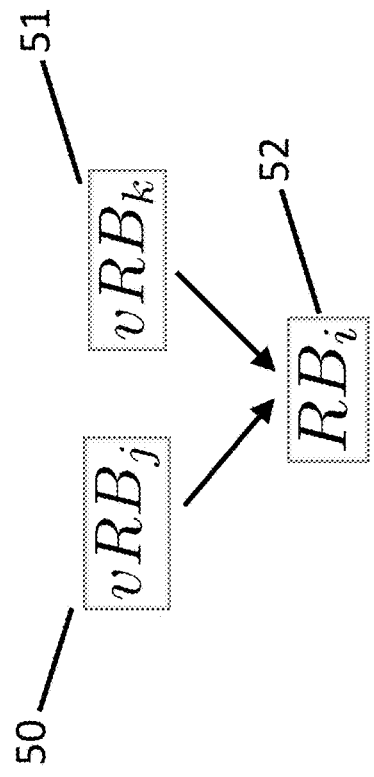
FIG. 3 illustrates how one-to-many and many-to-one vRB to RB mapping is allowed in the invention as well as the typical one-to-one mapping.
Figure 3:
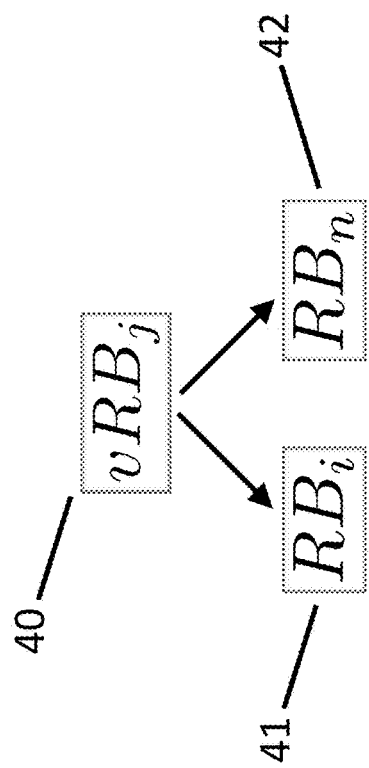

FIG. 3 shows how one-to-many and many-to-one vRB to RB mapping is allowed in the invention as well as the typical one-to-one mapping. FIG. 3a shows a case where a virtual resource block (40) is fragmented into two RBs (41 and 42) by the MAC layer of MNO. FIG. 3b shows how two virtual resource blocks (50 and 51) are multiplexed onto the same RB by the MAC layer of MNO.

Figure 4:
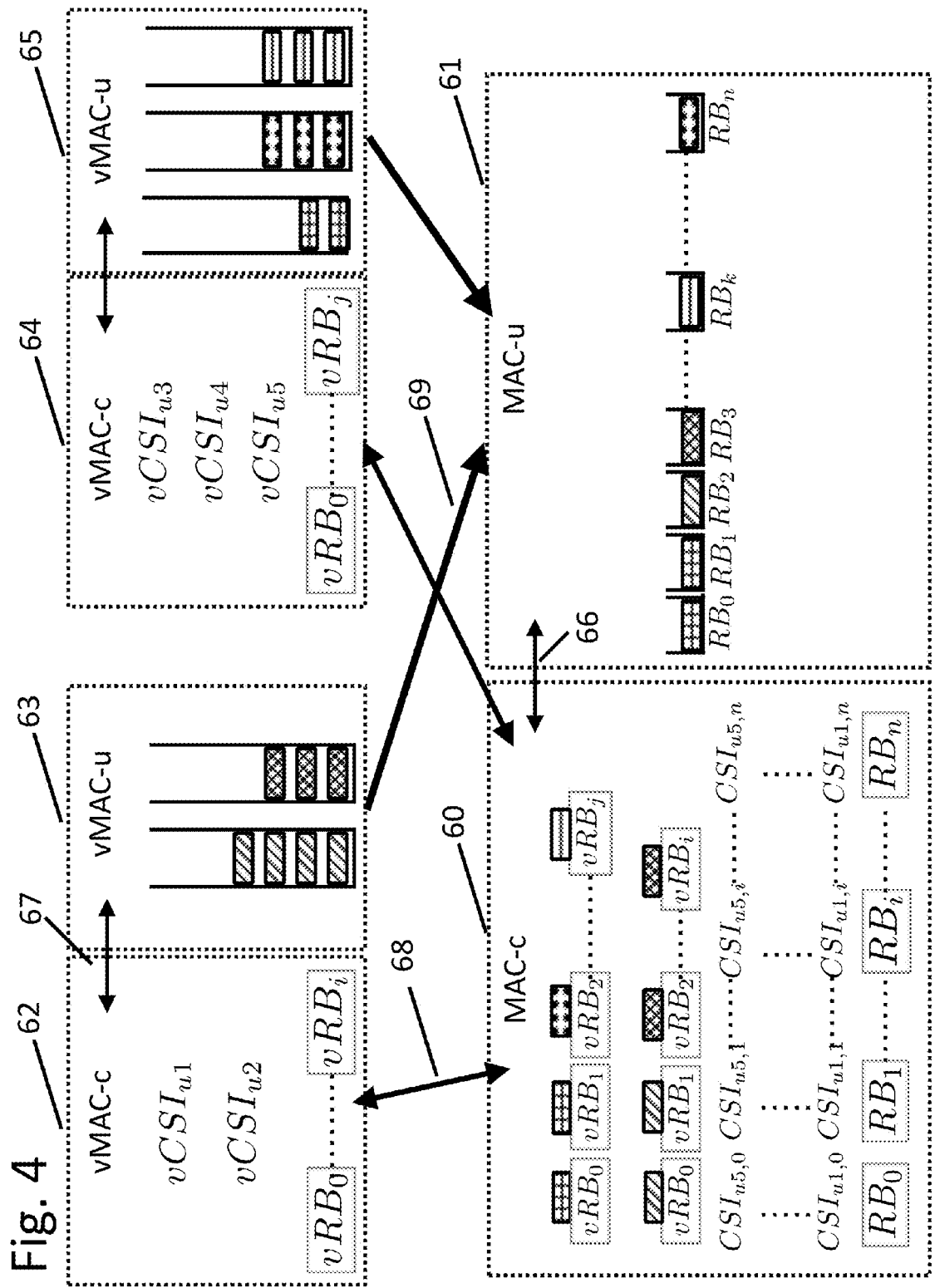
FIG. 4 shows an example of control plane and data/user plane split in the virtual MAC and physical MAC layers as well as the interfaces in between them.

FIG. 4 illustrates an example of control plane and data/user plane split in the virtual MAC and physical MAC layers as well as the interfaces in between them. The control plane of vMAC (vMAC-c) and the user plane of vMAC (vMAC-u) together constitute the vMAC for a given service group. FIG. 4 shows two vMACs that belong to two service groups. The first vMAC is comprised of (62) and (63), the second vMAC is comprised of (64) and (65). Similarly, the control plane of MAC (MAC-c) and the user plane of MAC (MAC-u) constitute the MAC layer of the MNO illustrated as (60) and (61) in FIG. 4, respectively. The vMAC-c has knowledge of vRBs assigned to its service group by the MAC-c. Each vRB has a list of per user channel state information. In FIG. 4, the per user channel state information is shown as $vCSI_{ui}$ representing the virtual CSI for user $u_i$, which is the same value for all vRBs of the vMAC. $vCSI_{ui}$ is provided by MAC-c to each of vMAC-c. In the example illustrated in FIG. 4, the first vMAC has two active flows and the second vMAC has three active flows. vMAC-u performs the buffer management for these flows and share buffer state as wells flow information with vMAC-c through an internal interface (e.g., 67 in FIG. 4). Using its own scheduling algorithm, each vMAC-c conducts flow to vRB assignments based on $vCSI_u$ and flow information and informs MAC-c about these assignment decisions. The MAC-c, with the knowledge of flow assignment decisions for vRBs from each vMAC and using the per resource block CSI information for each user ($CSI_{ui,j}$), makes the final assignment of resource blocks to individual flows and communicates this decision with an internal interface (66) to MAC-u. The MAC-u then directly pulls the packets from each vMAC-u based on the assignment by MAC-c to fill the transmission buffers for each resource block.

Figure 5:
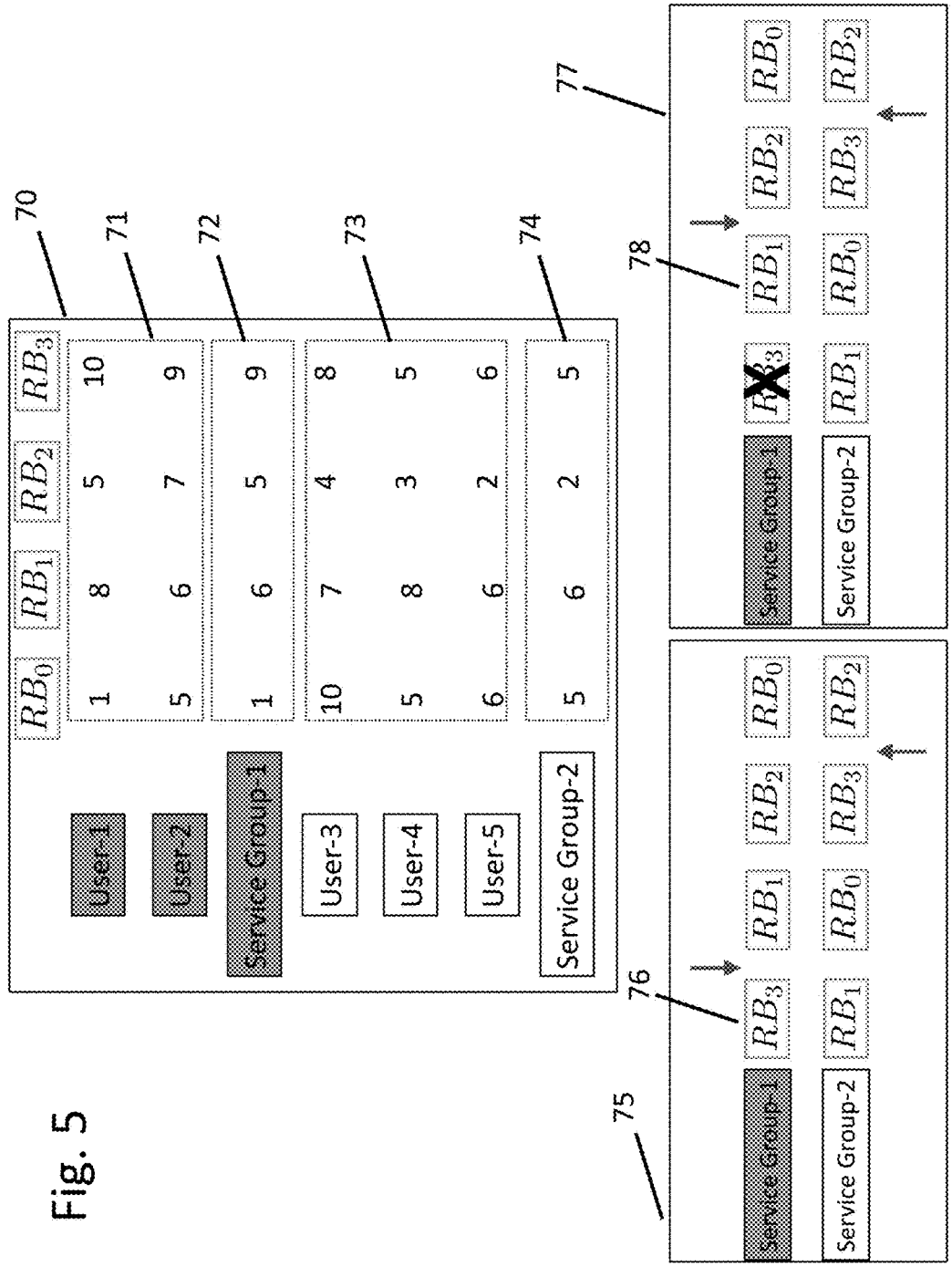
FIG. 5 shows an example of how the MNO maps vRBs to RBs for each vMAC.

FIG. 5 illustrates an example of how the MNO maps vRBs to RBs for each vMAC. In the figure, a Channel Quality Indicator (CQI) is used as the main CSI indicator as an example. The higher CQI value indicates a better channel condition and a corresponding modulation and coding scheme resulting in a higher rate. Typically there are as many CQI levels as the transmission modes supported by a given wireless system standard. The per RB CQI value for each user may be received as feedback from said user, or alternatively, may be estimated using interpolation of the feedback received. The example assumes that there are two service groups with two distinct vMACs. Service Group-1 has a lease for 1 vRB and Service Group-2 has a lease for 3 vRBs in the example. Furthermore, the example considers a wireless network with 4 RBs—$RB_0$ through $RB_3$. Table (70) lists the CQI values for all users for all RBs, grouping the users according to their service group memberships as (71) and (73). For each service group, a distinct per group CQI is generated next for each RB as illustrated in (72) and (74). In the figure, for each RB the group CQI is set to be equal to the minimum CQI value among users of that group as an example method. Next, the RBs are ordered according to the group CQI values in descending order for each service group as illustrated in (75). Using (75), vRB to RB mapping is now conducted for each service group in an iterative fashion until all potential conflict are resolved. In the first iteration, Service Group-1, which has a lease for 1 vRB is assigned $RB_3$ and Service Group-3, which has a lease for 3 vRBs is assigned $RB_1$, $RB_0$ and $RB_3$, since these RBs provide the highest group CQIs for them. In this initial mapping a conflict is observed as illustrated in (76). Here, we observe that $RB_3$ is assigned to both service groups. In (77), the iterative conflict resolution operation is depicted. In the example, it is decided to iterate the mapping by altering the map for Service Group-1. The choice of which mapping to be altered depends on how many next best unassigned RB's each service group has left on its ordered list. The service group with the least remaining next best unassigned RBs is assigned the conflicting RB and all other service groups are assigned their next best unassigned RBs in the preferred embodiment. In the case where there is more than one service group with the same least number of next best unassigned RBs, the selection of the service group that will be assigned the conflicting RB could be randomly made or be based on the service level agreement that the service groups have. In the example, the conflict is resolved by altering the mapping for Service Group-1 so that this group is allocated its next best RB as shown in (78). However, this iteration creates a new conflict. So (77) needs to be repeated.

Figure 6:
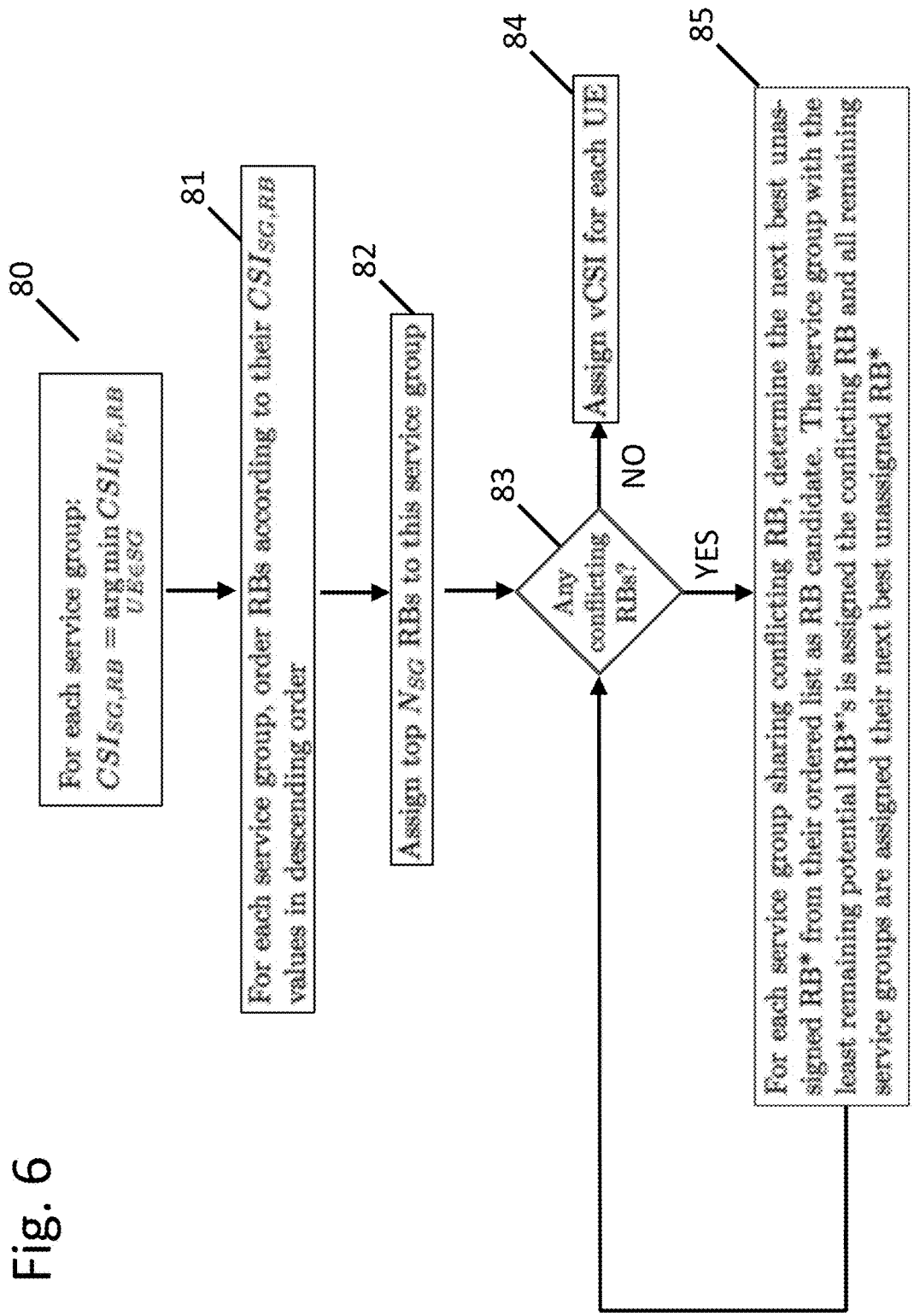
FIG. 6 depicts a flow chart to describe the vRB to RB mapping process with conflict resolution.

FIG. 6 depicts a flow chart to describe the vRB to RB mapping process with conflict resolution. In the figure, Service Group-i is assumed to have leased $N_{SG-i}$ vRBs. In the first step, a per RB group CSI value is computed using the CSI values of each user of said service group for that RB as shown in (80). In the figure, as an example, the CSI value of the worst user of that service group for the said RB is selected as the per RB group CSI value (e.g. for Service Group-i, this value is $CSI_{SG-i,RB}$). In the next step (81), the RBs are ordered according to the group CQI values, $CSI_{SG-i,RB}$ in descending order for each service group. Then, the $N_{SG-i}$ RBs that have the highest group CSI values are tentatively mapped to the vRBs that each service group has leased as shown in (82). The tentative mapping is then checked for conflicts (83). If there are any RBs that have been assigned to multiple service groups, then the mapping is said to be in conflict. If there is a conflict, it is resolved as stated in (85). With every resolution of a conflict, a new conflict may arise, thus until a conflict-free state emerges, the process continues in a loop executing step (85) repeatedly by adding more RBs into the assigned set of RBs. When there are no more conflicts, the vRB to RB mapping is complete for each service group (84).

A typical embodiment of the invention involves an architecture that consists of one MNO with multiple service groups. The service groups lease a number of vRBs for a given time period and may pay a monetary fee per vRB as specified by the service group agreements with the MNO. One of more of these service groups may belong to one or more MVNOs. In the system, the MNO provides a virtualization layer for the physical resource blocks assigned to the traffic flows. FIG. 1 shows how each service groups can run their scheduling algorithms in their respective vMACs (e.g., (20), (23), (26)). Each vMAC is responsible for assigning vRBs to individual traffic flows (e.g., (21), (24), (27)). The MAC layer of the MNO (e.g., 10) is responsible for mapping these vRBs onto one or more RBs (e.g., 11). Each RB corresponds to a particular set of wireless channels (e.g., sub-bands and time slots as in (13)) that are described by the wireless standard in use.

As an essential part of the invention, the channel state information (CSI) must be collected and conveyed to the vMACs of the service groups for their respective subscribers. FIG. 2 shows steps involved in the process. Each UE (e.g., (30) in FIG. 2) reports their channel measurements in the form of CSI to the MAC layer of MNO (e.g., (31) in FIG. 2). The MAC layer of MNO then provides virtual CSI (vCSI) to vMACs (e.g., (32)) of the service groups for each their subscribed UEs.

In one embodiment, the MNO can provide a high enough vCSI value for a UE that requires mapping vRBs assigned to the said UE to multiple RBs (e.g., FIG. 3a). In another embodiment, MNO can provide a low enough vCSI value for a UE such that multiple vRBs assigned to the said UE can be mapped onto the same RB by the MAC layer of MNO (e.g., FIG. 3b).

In a typical embodiment, the control and user plane of both MAC and vMAC layers are decoupled from each other, where the control plane monitors the queue, flow, channel states and makes scheduling decisions while the user plane processes the byte streams from each flow and carries out the wireless transmission/reception. In FIG. 4, the decoupling of MAC into MAC-c and MAC-u, the decoupling of vMAC into vMAC-c and vMAC-u, and the interfaces between each entity are shown. MAC-c has per UE, per RB channel state information ($CSI_{U,RB}$). $CSI_{U,RB}$ can be obtained via measurements at the base stations, reports by the UEs, and interpolation. In one embodiment, the MAC layer provides each vMAC only per user vCSI (e.g., $vCSI_{u1}$, $vCSI_{u2}$ for (62) in FIG. 4) that is the same for all vRBs allocated to the said vMAC. Then, the vMAC decides on how many of its vRBs are allocated to which flows using its own scheduler. In another embodiment, the MAC layer provides each vMAC a pair of values $(n, vCSI_u)$ for the UE u. This pair specifies the vMAC that the CSI value of $vCSI_u$ is to be used if UE u were assigned n vRBs by the said vMAC. Yet, in another embodiment, the MAC layer provides $vCSI_{UE,vRB}$, values to the vMACs which are distinct values for each vRB and for each UE.

The preferred method for computing the vCSI values is shown in FIG. 6 and an example to highlight the steps is illustrated in FIG. 5. The inputs to the procedure are $CSI_{UE,RB}$ (i.e., per UE per RB CSI values) and $N_{SG}$ (i.e., the number of vRBs leased by a given service group). The output is vCSI values, which can be just one value for all vRBs or can be multiple values to differentiate across vRBs, for each UE. The first step of the process considers each UE of a given service group to compute one group CSI value for each RB ($CSI_{SG,RB}$). As shown in (80) in FIG. 6, the preferred value used is the minimum CSI value among all the users of the particular service group. Another typical value can be the median CSI value of all users of the same service group. Yet another way of computing group CSI is to use the maximum CSI value of all users of the same service group. In FIG. 5, two service groups are considered as an example to illustrate the method. Service Group-1 has two active users, User-1 and User-2. For each RB, each user has channel quality indicator (CQI) values calculated based on the most recent measurements, or received from the corresponding UEs. (71) in FIG. 5 shows the sample rows that tabulate these per RB per user CQI values. For each RB, the MAC computes the lowest CQI measured for any user of Service Group-1 as shown in row (72). Service Group-2 has three active users, User-3, User-4, and User-5, of which corresponding CQI values are tabulated in the row group (73) and the group CQI value for Service Group-2 is evaluated in row (74). In FIG. 6, the next step (81) orders the group CQI values for the RBs ($CSI_{SG,RB}$) in descending order. In FIG. 5 this step is illustrated in box (75), where Service Group-1 has the ordering $RB_3$, $RB_1$, $RB_2$, $RB_0$, while Service Group-2 has the ordering $RB_1$, $RB_0$, $RB_3$, $RB_2$. In the next step in the embodiment (82 in FIG. 6), the MAC tentatively assigns $N_{SG}$ top RBs in the ordered list according to the lease agreement with the particular service group. Each of these RBs is a potential resource block onto which any vRB of that service group will be mapped. In the example illustrated in FIG. 5, (75) assigns 1 RB to Service Group-1 and 3 RBs to Service Group-2 based on their respective lease agreements. The next step (83 in FIG. 6) checks whether there are conflicting RB assignments in the tentative mapping. The RBs that are commonly assigned to at least two service groups are said to be in conflict as only one of the service groups can utilize a given RB. In FIG. 5, $RB_3$ is in conflict (76), as it is in both Service Group-1's and Service Group-2's assigned list. When there is a conflict, the process goes into conflict resolution stage (85 in FIG. 6). In stage (85), starting from any RB in conflict, for each conflicting service group, the MAC determines that service group's next best unassigned RB* in the sorted list. The service group that has the least number of remaining next best unassigned RB*'s is assigned the particular conflicting RB and all other service groups are assigned their next best unassigned RB*'s. In the case where there is more than one service group with the same least number of next best unassigned RB*'s, the selection of the service group that will be assigned the conflicting RB could be randomly made or be based on the service level agreement that the service groups have. In the example illustrated in FIG. 5, (77) shows the assignment state after executing step (85) in FIG. 6 once. The conflicting $RB_3$ is assigned to Service Group-2 and $RB_1$ is assigned to Service Group-1 to replace $RB_3$. In this state, now $RB_1$ (78 in FIG. 5) becomes in conflict as it is included in both Service Group-1 and Service Group-2's assigned sets. Thus, step (85) is repeated until all conflicts are resolved and the process reaches step (84) in FIG. 6. In step (84), based on the tentative RB assignments to each service group, per user vCSI values are determined for each vRB. In one embodiment, one single vCSI value is assigned for all vRBs for a given user. One preferred way of computing the single vCSI value for the said user is to take the minimum CSI value among the CSI values of the said user over all RBs tentatively that are assigned to the service group that serves the said user. In FIG. 5 for instance if $RB_2$ is assigned to Service Group-1 and $RB_0$, $RB_1$, and $RB_3$ are assigned to Service Group-2, then vCSI values for User-1 and User-2 become 5 and 7, respectively, while vCSI values for User-3, User-4, and User-5 become 7, 5, and 6, respectively. These advertised vCSI values guarantee that regardless of how many vRBs are assigned to each user, the vRB to RB ensures service guarantees.

In another embodiment, the MNO returns a list of 2-tuples for each UE j in the form $\{1, vCSI_j(1)\}$, $\{2, vCSI_j(2)\}$, $\{N_{SG}, vCSI_j(N_{SG})\}$. The first term in each 2-tuple is the number of vRBs that can be assigned to UE j by the service group serving UE j. The second terms $vCSI_j(k)$ is the advertised vCSI for UE j if service group would assign k vRBs to UE j. The total number of jointly feasible tuples (under the constraint that the total number of vRBs assigned to n active users of a service group can be at most N) is in the order of W. In one embodiment for small N and n values, each feasible assignment $\{\{k_1, vCSI_1(k_1)\}, \{k_2, vCSI_2(k_2)\}, \ldots, \{k_n, vCSI_n(k_n)\}\}$ such that $$\sum_{i=1}^{n} k_i = N$$

is enumerated. For each enumerated scenario, users are assigned a unique priority level among the priority levels 1 to n with 1 as the highest priority. According to this prioritization (or ordering) $vCSI_i$ is determined before $vCSI_{i+1}$. To find $vCSI_i$, the highest $k_i$ CSI valued RBs that are tentatively assigned to the service group of these users are picked. Among these highest $k_i$ CSI values, the lowest CSI value is used as the $vCSI_i$. The $k_i$ RBs considered for this computation are excluded from consideration when $vCSI_j$ (j>i) is to be computed. In one embodiment, the ordering of the users is done with respect to the average CSI value of each user over the RBs tentatively assigned to the service group of said users. In another embodiment, the ordering is done with respect to the median CSI value of each user over the RBs tentatively assigned to the service group of said users. In another embodiment, the ordering is done such that the user with the least throughput so far is given the highest priority. For general N and n values, enumerating each case and assigning a vCSI value for each possible assignment strategy by a service group would require excessive computation in a real-time environment. Therefore, this embodiment is preferred only when N and n are small (e.g., ≤3).

Yet, in another embodiment, tuples {1, vCSI$_j$(1)}, {2, vCSI$_j$(2)}, {N$_{SG}$, vCSI$_j$(N$_{SG}$)} for user j are generated by looking at the actual supported rates. In wireless systems, each CSI value is mapped to a particular rate supported at the physical layer transmission. Let this mapping be R(x), i.e., a given CSI or vCSI value corresponds to the rates R(CSI) or R(vCSI), respectively. Sufficiency conditions for an advertised vCSI value for UE j to guarantee a feasible vRB to RB mapping can be stated as:

$$k \cdot R(vCSI_j) \leq \sum_{o=1}^{k' \leq k} R(CSI_{f(j,o)}) \text{ for all } k = 1, \ldots, N_{MVNO} \quad (1)$$

In equation (1), f(j,o) is a sorted index function that shows the o-th lowest CSI value of user j over all the RBs tentatively assigned to the service group of user j. In the same equation, k is the number of vRBs that can be assigned to user j. A tuple {k, vCSI$_j$} is determined by setting vCSI$_j$ as the highest vCSI value that satisfies the condition in (1).

In vRB to RB mapping, MAC can utilize the first feasible assignment from which vCSI values are derived or it can recompute the mapping based on the vRB assignment decisions made by each vMAC. As in FIG. 3a, MAC can map one vRB to multiple RBs or map multiple vRBs of a particular user to the same RB such that the rate corresponding to the advertised vCSI for the said user is served.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-to readable storage media, machine-readable media, or machine-readable storage media).

Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a method and apparatus for virtualized resource block mapping. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A mapping method for medium access control (MAC) layer virtualization of a physical MAC layer plurality of physical resource blocks (RBs), the virtualization implemented using a plurality of virtual medium access control (vMAC) layers, each vMAC layer corresponding to a separate service group, where each service group programs its own scheduling logic in each vMAC layer, where a plurality of virtual resource blocks (vRBs) are associated with each vMAC layer, where the vRBs are filled with data packets according to the scheduling logic in each vMAC instance, the physical MAC layer virtualizing the RBs as vRBs and assigning them to each vMAC layer according to a service level agreement associated with each service group, each vMAC mapping traffic flows of subscribers associated with it onto assigned vRBs, service group-i leasing $N_{SG-i}$ vRBs, the method comprising:

(a) for each service group-i, computing a per RB, Service Group Channel State Information (CSI) value, $CSI_{SG-i,RB}$, using CSI values of each user of that service group, service group-i, for that RB;

(b) for each service group-i, ordering RBs according to their $CSI_{SG-i,RB}$ values in descending order;

(c) tentatively assigning $N_{SG-i}$ RBs having highest group CSI values to vRBs that each service group has leased;

(d) when a conflict exists when there is a RB that has been assigned to multiple service groups, determining a service group's next best unassigned RB* in list of ordered RBs, where service group having least number of remaining next best unassigned RB*'s is assigned a particular conflicting RB and all other service groups are assigned their next best unassigned RB*'s; and (e) repeating step (d) until no conflicts exist.

2. The method of claim 1, wherein $CSI_{SG-i,RB}$ is equal to a CSI value of a worst user of a given service group.

3. The method of claim 1, wherein selection of a service group that is assigned the conflicting RB is randomly made.

4. The method of claim 1, wherein a given vMAC allocates its leased vRBs to its own traffic flows through a custom mapping function.

5. The method of claim 4, wherein the custom mapping function takes into account one or more optimization objectives selected from the following: type of services or type of guarantees.

6. The method of claim 1, wherein CSI is received via a feedback from user equipment (UE) to the MAC layer, and then to an instance of vMAC, where the MAC layer transforms per UE per RB CSI into per UE virtual CSI (vCSI) for each vMAC instance and the vCSI, along with UE's queue states and quality of service (QoS) classes of traffic flows, determine how each vMAC makes assignment decisions for its own traffic flows.

7. The method of claim 1, wherein mapping of vRBs to RBs is based on one of the following strategies: (1) one-to-one mapping where one and only one vRB is mapped onto a given RB, (2) one-to-many where one vRB is fragmented and mapped onto two or more RBs, and (3) many-to-one where two vRBs are multiplexed together onto one RB.

8. The method of claim 1, wherein the MAC and the vMAC instances are each further divided into control and user plane functions.

9. The method of claim 1, the method further comprises the steps of: MNO returning a list of 2-tuples for each user equipment (UE) j in the form $\{1, vCSI_j(1)\}$, $\{2, vCSI_j(2)\}$, $\{N_{SG}, vCSI_j(N_{SG})\}$, where the first term in each 2-tuple corresponds to a number of vRBs that can be assigned to UE j by a service group serving UE j, the second terms $vCSI_j(k)$ corresponding to an advertised vCSI for UE j if service group would assign k vRBs to UE j, and a total number of jointly feasible tuples is in the order of $N''$.

10. The method of claim 9, wherein for small N and n values, each feasible assignment $\{\{k_1, vCSI_1(k_1)\}, \{k_2, vCSI_2(k_2)\}, \ldots, \{k_n, vCSI_n(k_n)\}\}$ is enumerated such that $$\sum_{i=1}^{n} k_i = N.$$

11. The method of claim 9, to find $vCSI_i$, the highest $k_i$ CSI valued RBs that are tentatively assigned to the service group of these users are picked and among these highest $k_i$ CSI values, the lowest CSI value is used as the $vCSI_i$.

12. The method of claim 11, wherein ordering of users is done with respect to an average CSI value of each user over RBs tentatively assigned to a given service group of such users.

13. The method of claim 11, wherein ordering is done with respect to a median CSI value of each user over RBs tentatively assigned to a given service group of such users.

14. The method of claim 11, wherein ordering is done such that users with least throughput are given the highest priority.

15. The method of claim 9, wherein tuples $\{1, vCSI_j(1)\}$, $\{2, vCSI_j(2)\}, \ldots, \{N_{SG}, vCSI_j(N_{SG})\}$ for user j are generated by looking at actual supported rates.

16. An article of manufacture comprising non-transitory computer storage medium storing computer readable program code which, when executed by a computer, implements a mapping method for medium access control (MAC) layer virtualization of a physical MAC layer with a plurality of physical resource blocks (RBs), the virtualization implemented using a plurality of virtual medium access control (vMAC) layers, each vMAC layer corresponding to a separate service group, where each service group programs its own scheduling logic in each vMAC layer, where a plurality of virtual resource blocks (vRBs) are associated with each vMAC layer, where the vRBs are filled with data packets according to the scheduling logic in each vMAC instance, the physical MAC layer virtualizing the RBs as vRBs and assigning them to each vMAC layer according to a service level agreement associated with each service group, each vMAC mapping traffic flows of subscribers associated with it onto assigned vRBs, service group-i leasing $N_{SG-i}$ vRBs, the method comprising:
(a) for each service group-i, computer readable program code computing a per RB, Service Group Channel State Information (CSI) value, $CSI_{SG-i,RB}$, using CSI values of each user of that service group, service group-i, for that RB;
(b) for each service group-i, computer readable program code ordering RBs according to their $CSI_{SG-i,RB}$ values in descending order;
(c) computer readable program code tentatively assigning $N_{SG-i}$ RBs having highest group CSI values to vRBs that each service group has leased;
(d) when a conflict exists when there is a RB that has been assigned to multiple service groups, computer readable program code determining a service group's next best unassigned RB* in list of ordered RBs, where service group having least number of remaining next best unassigned RB*'s is assigned a particular conflicting RB and all other service groups are assigned their next best unassigned RB*'s; and
(e) computer readable program code repeating step (d) until no conflicts exist.

17. A medium access control (MAC) layer virtualization system comprising:
a physical MAC layer, a plurality of physical resource blocks (RBs) associated with the MAC layer,
a plurality of virtual medium access control (vMAC) layers, each vMAC layer corresponding to a separate service group, where each service group programs its own scheduling logic in each vMAC layer,
a plurality of virtual resource blocks (vRBs) associated with each vMAC layer, the vRBs filled with data packets according to the scheduling logic in each vMAC instance, the physical MAC layer virtualizing the RBs as vRBs and assigning them to each vMAC layer according to a service level agreement associated with each service group, each vMAC mapping traffic flows of subscribers associated with it onto assigned vRBs,
where service group-i leasing $N_{SG-i}$ vRBs, and where the mapping scheme:
(a) computes, for each service group-i, a per RB, Service Group Channel State Information (CSI) value, $CSI_{SG-i,RB}$, using CSI values of each user of that service group, service group-i, for that RB;
(b) orders, for each service group-i, RBs according to their $CSI_{SG-i,RB}$ values in descending order;
(c) tentatively assigns $N_{SG-i}$ RBs having highest group CSI values to vRBs that each service group has leased;
(d) when a conflict exists when there is a RB that has been assigned to multiple service groups, determines a service group's next best unassigned RB* in list of ordered RBs, where service group having least number of remaining next best unassigned RB*'s is assigned a particular conflicting RB and all other service groups are assigned their next best unassigned RB*'s; and
(e) repeats step (d) until no conflicts exist.

18. The system of claim 17, wherein $CSI_{SG-i,RB}$ is equal to a CSI value of a worst user of a given service group.

19. The system of claim 17, wherein selection of a service group that is assigned the conflicting RB is randomly made.

20. The system of claim 17, wherein a given vMAC allocates its leased vRBs to its own traffic flows through a custom mapping function.

21. The system of claim 20, wherein the custom mapping function takes into account one or more optimization objectives selected from the following: type of services or type of guarantees.

22. The system of claim 17, wherein CSI is received via a feedback from user equipment (UE) to the MAC layer, and then to an instance of vMAC, where the MAC layer transforms per UE per RB CSI into per UE virtual CSI (vCSI) for each vMAC instance and the vCSI, along with UE's queue states and quality of service (QoS) classes of traffic flows, determine how each vMAC makes assignment decisions for its own traffic flows.

23. The system of claim 17, wherein mapping of vRBs to RBs is based on one of the following strategies: (1) one-to-one mapping where one and only one vRB is mapped onto a given RB, (2) one-to-many where one vRB is fragmented and mapped onto two or more RBs, and (3) many-to-one where two vRBs are multiplexed together onto one RB.

24. The system of claim 17, wherein the MAC and the vMAC instances are each further divided into control and user plane functions.

* * * * *